United States Patent [19]

Meisenheimer, Jr. et al.

[11] 3,921,656
[45] Nov. 25, 1975

[54] SELF-CLOSING BREAKAWAY VALVE ASSEMBLIES

[75] Inventors: Daniel T. Meisenheimer, Jr., Orange; Daniel T. Meisenheimer, III, Seymour; Richard C. Meisenheimer, Orange, all of Conn.

[73] Assignee: Spectrum Associates, Inc., Milford, Conn.

[22] Filed: June 20, 1974

[21] Appl. No.: 481,205

[52] U.S. Cl. ............ 137/68; 137/75; 137/614.02
[51] Int. Cl.² ........................................ F16K 17/40
[58] Field of Search ............. 137/68, 71–77, 137/614, 614.02, 614.03, 797; 251/149.2; 73/333; 285/2

[56] References Cited
UNITED STATES PATENTS

| | | | |
|---|---|---|---|
| 1,515,461 | 11/1924 | Dallas et al. | 137/77 X |
| 3,078,068 | 2/1963 | Romney | 137/614.03 X |
| 3,590,956 | 7/1971 | Obergefell et al. | 251/309 X |
| 3,726,299 | 4/1973 | Wheatley | 137/75 |

FOREIGN PATENTS OR APPLICATIONS

| | | | |
|---|---|---|---|
| 91,261 | 12/1895 | Germany | 73/333 |
| 2,110,643 | 9/1971 | Germany | 137/75 |
| 1,013,449 | 12/1965 | United Kingdom | 137/68 |

Primary Examiner—Irwin C. Cohen
Assistant Examiner—Richard Gerard
Attorney, Agent, or Firm—Wooster, Davis & Cifelli

[57] ABSTRACT

Self-closing breakaway valve assemblies comprised of two valve housings each having a rotatable valve member rotatably mounted therein and spring biased to close. The valve housings are connected by frangible means and the rotatable valve members are held open by trigger means interposed therebetween. The trigger means releases upon separation of the valve housings to permit the rotatable valve members to close. The trigger member may be heat-softenable wherein the rotatable valve members are released to close upon application of heat as well as upon separation of the valve housing.

19 Claims, 7 Drawing Figures

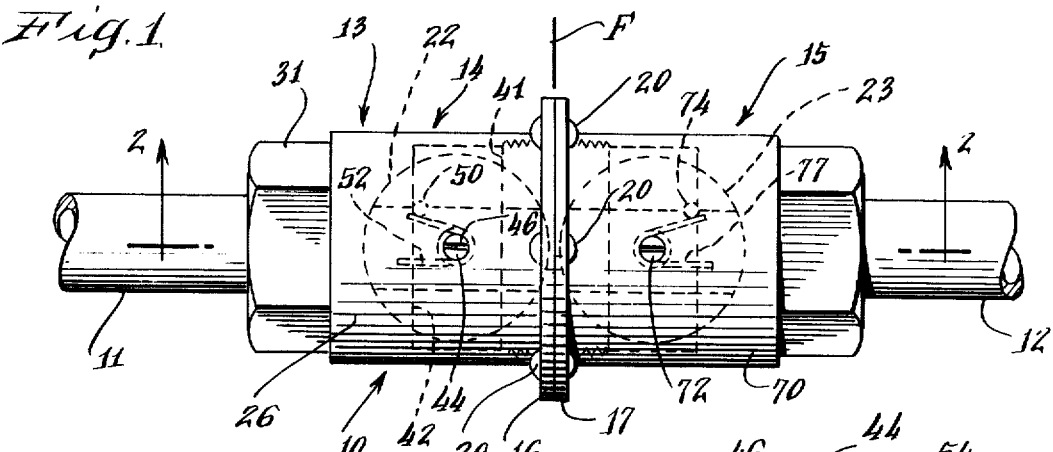
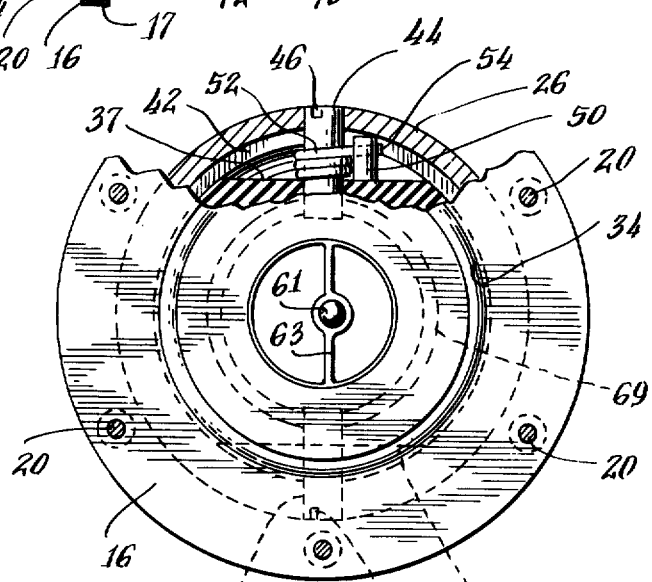
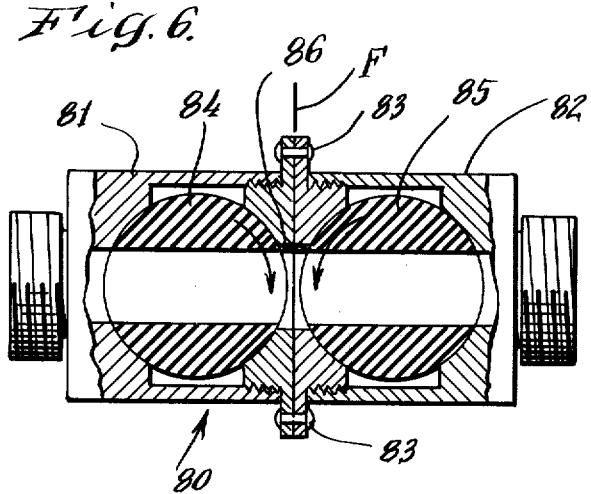
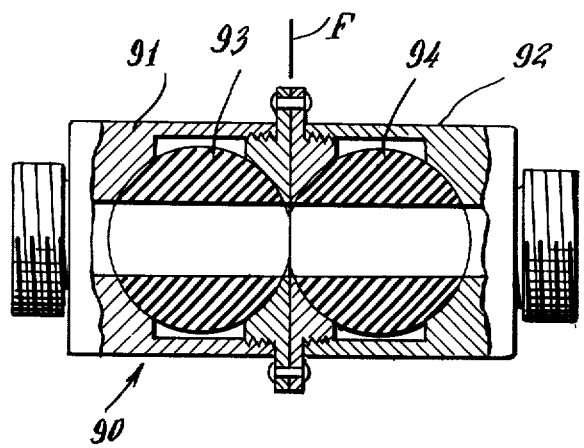

SELF-CLOSING BREAKAWAY VALVE ASSEMBLIES

BACKGROUND OF THE INVENTION

This invention relates to self-closing breakaway valves, and more particularly it relates to a self-closing breakaway valve assembly which includes a frangible portion interposed between two self-closing valve members which close upon separation at the frangible portion.

Self-closing breakaway valve assemblies are installed in the fuel lines of aircraft or other vehicles in positions where the fuel line is vulnerable to being severed in a crash. Absent a self-closing breakaway valve assembly, a severed fuel line would permit fuel contained within the fuel line and the fuel tanks connected thereto to escape and cause or contribute to a fire.

PRIOR ART

Self-closing breakaway valve assemblies used for this purpose generally comprise a housing having a frangible section and two poppet or other sliding valve members mounted within the housing on each side of the frangible section. The two poppet valves may be biased to close either toward or away from each other, and a complex trigger mechanism comprising an elongated pin usually confined within the valve body is provided to maintain the poppet valves in an open position. The pin is released upon separation of the valve housing at the frangible section, thereby freeing the poppet valves to close and seal off the fuel line on both sides of the valve housing.

There have been several problems associated with the known self-closing breakaway valve assemblies. Loads which cause the frangible section of the valve assembly to break often distort the housing and cause either the pin or the poppet or other sliding valve members to stick, whereby one or both valve members fails to close. Icing conditions can occur on the valve seats and prevent the valves from sealing effectively. The pin which is utilized to hold the poppet valves open sometimes becomes lodged between the valve members and their valve seat to prevent complete closure of the valve, and the pin may also be displaced on application of a shock load to the valve assembly wherein the valves would close even through no breakage of the valve assembly along the frangible section had occurred. Also, because the poppet valves are positioned in the line of fuel flow the poppet valves may be displaced by surges of fluid, sometimes causing premature closure of the valve assembly. In this regard it should be noted that no provision for visual indication of whether the valves are open or closed is provided in the known self-closing breakaway valve assemblies.

The poppet valves of known self-closing breakaway valve assemblies generally do not provide a full, free flow of fuel, annd substantial pressure drops across these assemblies constitute one of their major drawbacks. Also, each poppet valve provides only a single seat, the sealing of which is enhanced by rubber seals or the like. However, the seals are exposed to fuel while the valve assembly is in an open, standby mode, and the seals become degraded.

These and other problems associated with known self-closing breakaway valve assemblies as well as examples of such assemblies are described in the following publication: USAAMRDL Technical Report 71-65, Evaluation of Self-Sealing Breakaway Valves for Crashworthy Aircraft Fuel Systems, by Bruce Anson November, 1971, which is available from the U.S. Department of Commerce under Accession No. AD 738204.

Inasmuch as the self-closing breakaway valve assemblies are critically important in preventing or limiting fires in the event of the crash of an aircraft or other vehicle in which they are incorporated, they must be capable of existing for long periods in a standby mode with subsequent reliable operation in the event of fracture. A design which has possibility of failure cannot be tolerated.

SUMMARY OF THE INVENTION

A self-closing breakaway valve assembly according to the invention herein comprises a valve body having rotatably mounted therein two valve members disposed one on each side of a frangible portion of the valve body. The rotatable valve members have bores formed therethrough which are aligned when the valve members are open to provide a full fuel flow with extremely low pressure drop through the valve body. The rotatable valve members are spring biased to close, and are held open either by direct engagement with each other or by engagement through interposed trigger means. The trigger means preferably includes a thin spider member spanning the bore of each of the rotatable valve members wherein the spider members are positioned immediately adjacent each other when the rotatable valve members are open, and a ball entrapped between the spider members in concave dimples formed therein. The ball provides positive engagement between the rotatable valve members and maintains them open. Upon separation of the valve body at the frangible portion thereof, the ball is released and the positive engagement between the rotatablve valve members is destroyed, permitting them to rotate by virtue of their spring bias to close and thereby quickly and positively shut off fuel flow through the valve body. The small ball does not offer any possible interference with the closing of the rotatable valve members, and upon closing, the rotatable valve members present a smooth surface which cannot be forced open by impinging debris. The ball held between the spider members is centrally positioned within the valve body and in particular with respect to the frangible portion thereof, wherein the trigger means is equally sensitive to separation of the valve body at all points around the frangible portion thereof. Thus, the self-closing breakaway valve assembly closes quickly in response to fracturing loads applied in any mode, i.e., shear, bending or axial, and from any direction. However, the self-closing breakaway valve assembly is insensitive to shock or vibration so that the rotatable valve members will not close accidentally.

The trigger means may be fabricated of material such as cerrobenz metal alloy which softens at elevated temperatures, so that the positive engagement between the rotatable valve members is destroyed to permit the rotatable valve members to close in a fire condition, thereby cutting off the fuel flow through the valve body which might feed the fire. This feature of the invention is also applicable to improve known self-closing valves, and is accomplished by fabricating at least a portion of their trigger mechanisms of heat-softenable material.

Each rotatable valve member is received in a mating cavity in the valve body of the self-closing breakaway valve assemblies according to the invention herein, and thus serve to support the valve body. The resultant structure is resistant to deformation which would prevent the valve member from rotating. Shafts on which the rotatable valve members are mounted extend through the walls of the valve body to provide visual indication of the open or closed condition of the rotatable valve members. The rotatable valve members provide two seals in their closed position, one at each side of the rotatable member. The double seal configuration provides excellent overall sealing. Also, when rubber seals or the like are used in conjunction with the rotatable valve members, the seals are protected by the housing and are not exposed to fuel flow which might otherwise degrade the seals.

The self-closing breakaway valve assemblies according to the invention herein have a minimum of moving parts, are highly rugged, and yet offer dependable operation.

Accordingly, a principal object of the invention is to provide a highly reliable self-closing breakaway valve assembly.

Another object of the invention is to provide a self-closing breakaway valve assembly which closes in response to shear, bending or tensile loads thereon and combinations thereof.

A further object of the invention is to provide a self-closing valve assembly which operates in response to heat.

An additional object of the invention is to provide a self-closing breakaway valve assembly which cannot become fouled and fail to operate.

Yet another object of the invention is to provide a self-closing breakaway valve assembly which provides full fuel flow therethrough without pressure drop.

A still further object of the invention is to provide a self-closing breakaway valve assembly which is insensitive to shock and vibration and operates quickly and positively in a breakaway situation.

An additional object of the invention is to provide a self-closing breakaway valve assembly with means indicating it is open.

Other and more particular objects of the invention will in part be obvious and will in part appear from a perusal of the following description of the preferred embodiments and claims taken together with the drawings.

DRAWINGS

FIG. 1 is a side elevation view of a self-closing breakaway valve assembly according to the invention herein and showing the rotatable valve members thereof open;

FIG. 5 is a sectional view of the self-closing breakaway valve assembly taken along the lines 5—5 of FIG. 2;

FIG. 6 is a schematic sectional view of an alternative embodiment of a self-closing breakaway valve assembly according to the invention herein; and FIG. 7 is a schematic sectional view of yet another embodiment of a self-closing breakaway valve assembly according to the invention herein.

The same reference numbers refer to the same elements throughout the various figures.

DESCRIPTION OF THE PREFERRED EMBODIMENTS

Figure 2:
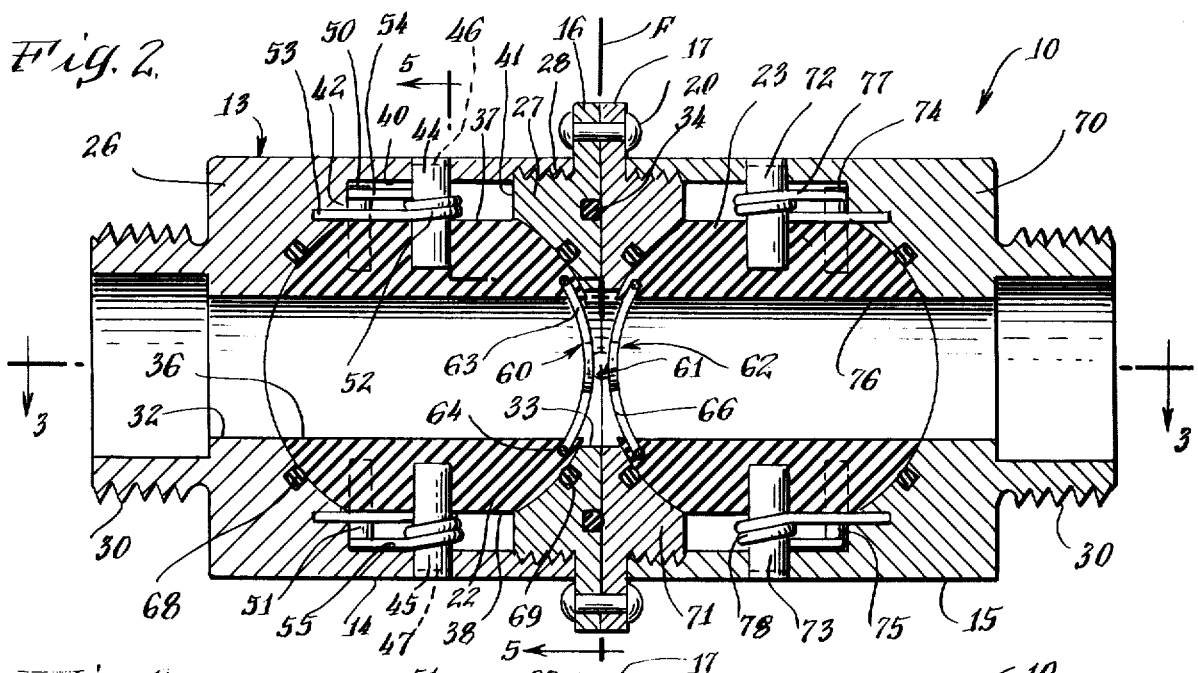
FIG. 2 is a sectional view of the self-closing breakaway valve assembly taken along the lines 2—2 of FIG. 1.

The invention herein is directed to self-closing breakaway valve assemblies for use in the fuel lines of aircraft or other vehicles to seal off the fuel lines in the event of a crash or other extreme stress condition which could otherwise sever the fuel lines and permit fuel to escape therefrom.

Referring now to FIG. 1, a self-closing breakaway valve assembly 10 according to the invention herein is shown interposed in two portions 11 and 12 of a fuel line. The self-closing breakaway valve assembly 10 has a body 13 comprised of two similar valve housings 14 and 15 joined together by frangible means. In the embodiment shown in FIG. 1, the valve housings 14 and 15 include radial flanges 16 and 17 which are joined together by frangible rivets 20, and the flanges 16 and 17 define a plane of frangibility F between the valve housings 14 and 15. The valve housing 14 contains a rotatable valve member 22 and valve housing 15 contains a similar rotatable valve member 23, providing one valve member on each side of the plane of frangibility F. Both of the rotatable valve members are spring biased to close but are held open by a trigger mechanism engaging the rotatable valve members across the plane of frangibility F, and permit flow of fuel through the self-closing breakaway valve assembly 10. Upon application of shear, bending or tensile loads to the body 13 of the self-closing breakaway valve assembly, the frangible rivets 20 break and permit the valve housings 14 and 15 to separate. Upon separation of the valve housings 14 and 15, the trigger mechanism releases the two rotatable valve members 23 and 22, which rapidly close to seal off fuel flow. The self-closing breakaway valve assembly 10 also closes in response to heat to seal off fuel flow between portions 11 and 12 of the fuel line.

A sectional view of the self-closing breakaway valve assembly 10 is shown in FIG. 2. The valve housing 14 thereof is generally cylindrical and comprised of an outer member 26 and an inner member 27 which are threaded together at 28. The "outer" and "inner" designation of parts 26 and 27 refers to their positions with respect to the plane of frangibility F. The outer housing member 26 includes a threaded fitting 30 to which the fuel line 11 may be attached by means of a coupling nut 21 (see FIG. 1). The outer member 26 of housing 14 includes a bore 32 for joining with the bore of fuel line 11 and providing fuel flow into and partially through the breakaway self-closing valve assembly 10. It will be appreciated that other types of fittings for accepting other types of fuel line connectors may be provided as a portion of outer member 26 of housing 14 in place of the threaded connector 30.

The inner member 27 of housing 14 includes the flange 16 through which the frangible rivets 20 are passed. The inner housing member 27 has a bore 33 formed therein axially aligned with the bore 32. Bore 33 is preferably slightly enlarged with respect to bore 32 in order to provide additional cross sectional area for fuel flow to compensate for the trigger mechanism disposed within the bore, as will be more fully described below. Inner housing member 27 has an annular groove confining an O-seal 34 for providing a sealed interface between the left valve housing 14 and the right valve housing 15 at the plane of frangibility F.

The outer and inner housing members 26 and 27 together define a generally spherical chamber in which the rotatable valve member 22 comprising a ball truncated at surfaces 37 and 38 is matingly received. The two bores 32 and 33 are axially aligned with a bore 36 in the rotatable ball 22 when it is in its open position, as is shown in FIGS. 1–3 and 5, wherein a passage for flow of fuel through valve housing 14 is provided.

A large annular groove 40 opens from and surrounds the chamber in which the ball 22 is received. The sidewalls of the annular groove 40 provide shoulders 41 and 42 which are perpendicularly disposed with respect to the flat truncated surfaces 37 and 38 of the ball 22. Shoulder 42 comprises a portion of the outer housing member 26, and shoulder 41 comprises a portion of the inner housing member 27.

The ball 22 is rotatably mounted within the valve housing 14 by means of shafts 44 and 45 which are seated in sockets centrally located on the truncated surfaces 37 and 38 of ball 22. The shafts 44 and 45 extend outwardly from the ball 22 and are rotatably received in openings in the outer wall of housing member 26 of valve housing 14. Slots 46 and 47 may be provided on the exposed end surfaces of shafts 44 and 45 respectively and the slots are preferably aligned with the axis of bore 36 through ball 22. The slots 46 and 47 thereby provide an external visual indication of the orientation of the bore of ball 22, as best seen in FIG. 1.

A pin 50 mounted in another socket in the flat truncated surfaces 37 of ball 22 protrudes upwardly from the surface 37 and is offset from generally parallel to shaft 44. A pin 51 coaxial with pin 50 is similarly mounted and oriented with respect to the opposite truncated surface 38 of the ball 22 and shaft 45. When the ball 22 is in the open position, i.e., when the bore 36 through ball 22 is aligned with the bores 32 and 33, the pins 50 and 51 are grounded against the shoulder 42.

Figure 4:
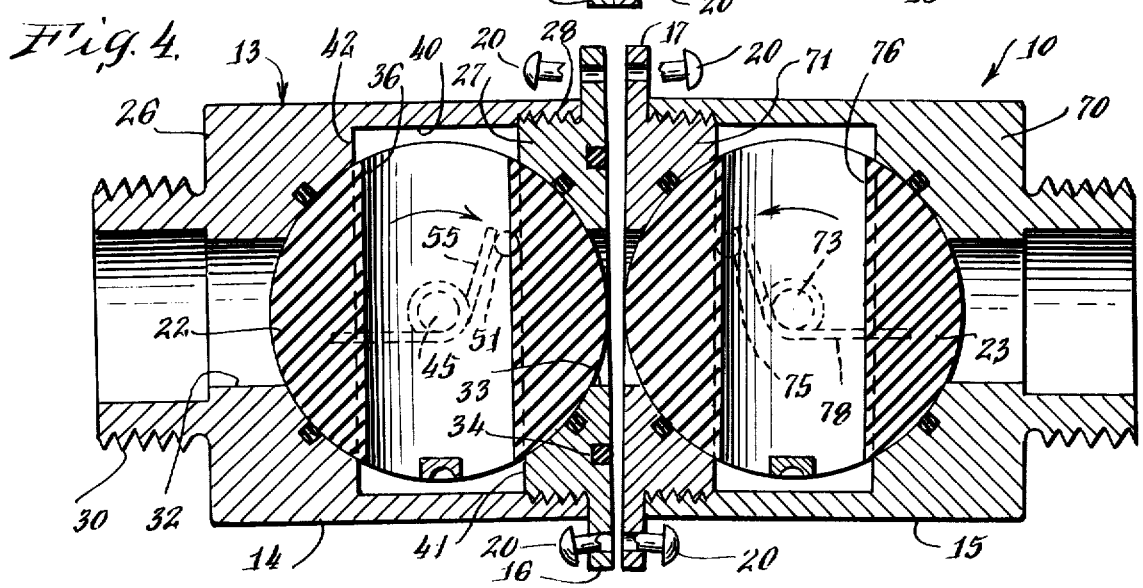
FIG. 4 is a sectional view of the self-closing breakaway valve assembly similar to FIG. 3 and showing the rotatable valve members thereof closed.

As best seen in FIGS. 1 and 2, a torsion spring 52 is carried around shaft 44, and has one end 53 seated in an opening in shoulder 42. The other end 54 of torsion spring 52 is engaged against pin 50. A similar torsion spring 55 is mounted surrounding shaft 45 with one of its ends engaging pin 51. The torsion springs 52 and 55 serve to rotate the ball 22 to its closed position as shown in FIG. 4, i.e., the ball 22 is rotated so that its bore 36 is transverse in the valve housing 14 and the outer surfaces of the ball seal off the bores 32 and 33. It will be noted that the pins 50 and 51 are grounded against the annular shoulder 41 when the ball is in the closed position, and that the pins 50 and 51 limit the rotation of the ball to approximately 90° so that the bore 36 of the ball 22 is transverse with respect to the axis of bores 32 and 33 of the valve housing 14.

Valve housing 15 is similar to valve housing 14, and accordingly will not be described in detail. It generally comprises an outer housing member 70 threadedly connected to an inner housing member 71 which includes flange 17 connected by frangible rivets 20 to flange 16. The rotatable valve member 23 comprises a truncated ball rotatably mounted on shafts 72 and 73 and provided with pins 74 and 75 for grounding the ball in its open and closed positions. A bore 76 in ball 23 provides a fuel flow passage when the ball is in its open position, and torsion springs 77 and 78 spring bias the ball to its closed position. The rotatable valve members 22 and 23 rotate in opposite directions to their closed positions, as best seen in FIG. 4.

The rotatable valve members 22 and 23 are held in their open positions by a trigger mechanism which comprises a spider member 60 of rotatable valve member 22, a trigger ball 61, and a spider member 62 of rotatable valve member 23. The spider member 60 comprises a curved cross member 63 which spans the diameter of the bore 36 of ball 22, as best seen in FIG. 5. The curved cross member 63 is preferably integral with a ring 64 which is carried in a peripheral notch in ball 22 surrounding the outlet of bore 36 whereby the spider member 60 is attached to ball 22. A concave dimple 65 is provided in the center of cross member 63 for receiving a portion of trigger ball 61. Spider member 62 of rotatable valve member 23 is similar, including a cross member 66 having a concave dimple 67 for receiving another portion of the trigger ball 61. Alternatively, small flat facing surfaces of the cross members 63 and 66 may directly interengage to hold the rotatable valve members open, thereby eliminating the trigger ball.

Figure 3:
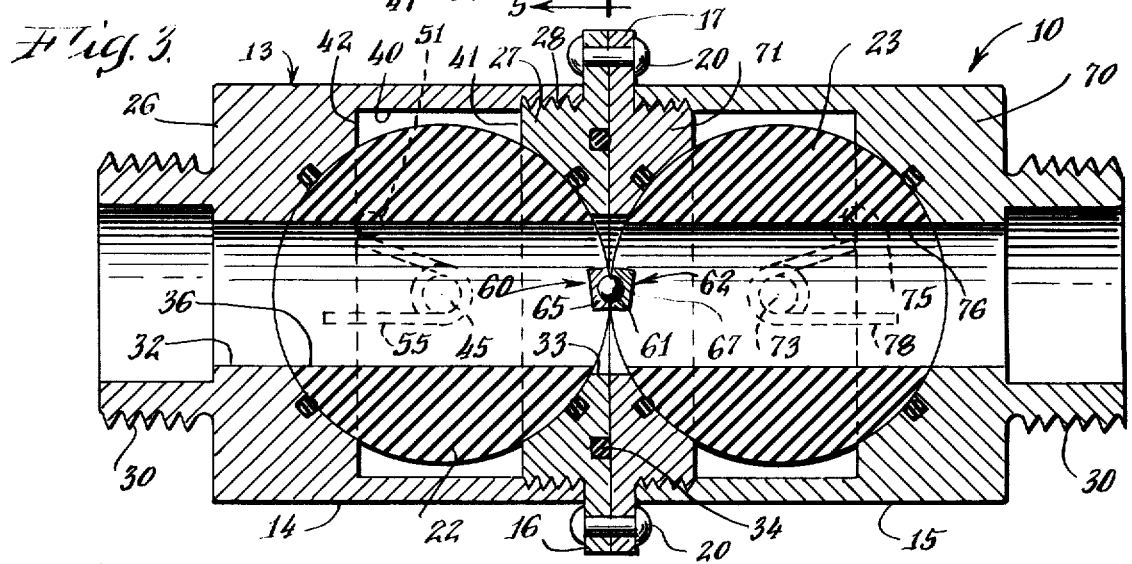
FIG. 3 is a sectional view of the self-closing breakaway valve assembly taken along the lines 3—3 of FIG. 2.

Referring now to FIGS. 3 and 5, in the preferred embodiment of the invention illustrated the cross members 63 and 66 of spiders 60 and 62 are preferably slightly "over-centered" with respect to a line drawn between the axes of rotation of the balls 22 and 23, which are mounted to rotate in the opposite directions. Thus, any incremental rotation of valve members 22 and 23 in the closing direction serves to increase the interfering interengagement between the trigger ball 61 and the spiders 60 and 62. This "overcentered" orientation of the spider members is provided to insure that shock forces will not trigger closure of the assembly.

The self-closing breakaway valve assembly 10 is assembled with the rotatable valve members 22 and 23 in their open positions. Trigger ball 61 is engaged between the spider members 60 and 62 to hold the rotatable valve members 22 and 23 in their opened positions against the biased-to-close spring force provided by the torsion springs 52, 55, 77 and 78. Upon separation of the valve housings 14 and 15 at the frangible plane F as shown in FIG. 4, the trigger ball 61 is released from engagement between spider members 60 and 62 and the torsion springs quickly rotate the valve members to their closed positions. It should be noted that the trigger ball, being small and spherical in shape, will not interfere with the closing of the valve members despite being loose in the vicinity of the valve members as they close.

A very small separation is required to release the trigger ball and permit the rotatable valve members to close. Because the rotatable valve members close in response to slight separation only an extremely small amount of fuel is lost through the separation prior to the rotatable valve members closing. Due to the close proximity of the rotatable valve members, only a small amount of fuel is lost from between them when they close. The rotatable valve members close so quickly that fuel in bores 36 and 76 is substantially retained therein.

The self-closing breakaway valve assembly 10 described has the advantage of providing a double seal at each breakaway valve housing 14 and 15, i.e., the rotatable ball valve members 22 and 23 effectively present two closed paths to escaping fuel. Further, the valves are of a "hard seat" type, i.e., the close tolerances between the rotatable valve members 22 and 23 and their housing are alone sufficient to substantially prevent fuel flow through the valve assembly when the rotatable valve members are closed. However, annular O-seals 68 and 69 may be provided in annular grooves adjacent to the bores 32 and 33 respectively of valve housing member 14, and similar annular O-seals are provided in valve housing 15 for optimum sealing. The O-seals 70 and 71 are protected from contamination and degradation by fuel when the valve is in its open position. Again double seals are thereby provided against flow of fuel from the valve housing 14 when the rotatable valve member 22 is closed.

Upon complete separation of valve housings 14 and 15, the smooth surfaces of the closed rotatable valve members are exposed. These smooth surfaces afford no possibility of the valve members being accidentally rotated to their open position by impinging debris. Further, the support the rotatable valve members receive in their valve housings prevents them from being displaced by debris, or from being opened by suction.

The breakaway valve assembly according to the invention herein is self-closing in response to shear, bending, and tensile loads, and any of these loads will cause the frangible rivets 20 to break and permit valve housings 14 and 15 to separate, thus releasing the engagement between the spider members 60 and 62 and trigger ball 61 to permit the valve to close. An advantageous feature of the self-closing breakaway valve assembly 10 described above is that the trigger ball is positioned on the plane of frangibility equidistant from the frangible portions of the valve body. Thus, the trigger mechanism is equally sensitive for all fracture initiations, whenever they occur on the periphery of the frangible portions.

Although the self-closing breakaway valve assembly 10 is designed to close upon separation of the valve housings 14 and 15 at the plane of frangibility F in accordance with the usual known requirements of such assemblies, it is also designed to close in response to excessive heat conditions. This is accomplished by fabricating the ball 61 of a heat-softenable material, such as some plastics or a lead-tin alloy known as cerrobenz. Thus if a crash and subsequent fire occur in the aircraft or vehicle in which the self-closing breakaway valve assembly is mounted and the crash does not separate and trigger the self-closing breakaway valve assembly, the heat from the fire caused by the crash will melt the trigger ball 61 and release the valve members 22 and 23 to close. Fuel flow is cut off, which will stop any leakage of fuel from the fuel supply through a damaged portion of the fuel system downstream from the self-closing breakaway valve assembly. Alternatively, the spider members 60 and 62 can be fabricated of a heat-softenable material to accomplish the same purpose. This feature of the invention herein is applicable to known self-closing breakaway valve assemblies by fabricating at least a portion of their trigger mechanisms of heat-softenable or heat-sensitive materials.

Another advantageous feature of the self-closing breakaway valve assemblies according to the invention herein is the extremely low pressure drop through the valve body. As best seen in FIG. 5, the spider cross member 63 and trigger ball 61 block only a very small portion of the cross sectional area of bore 36, and as noted above, the bore 33 in inner housing member 27 is slightly enlarged with respect to bore 36 of the rotatable valve member in order to compensate for the presence of the cross member 63 and trigger ball 61 within the bore. the exceedingly low pressure drop through the valve assembly also results because the valve members do not constitute a blockage of fuel flow straight through the valve, and very little turbulence is created in the flow.

Referring now to FIG. 6, an alternative embodiment 80 of a self-closing breakaway assembly according to the invention herein is shown. It generally comprises a left valve housing member 81 and a right valve housing member 82 frangibly connected by frangible rivets 83. Rotatable valve members 84 and 85 are pivotally mounted and spring biased to close in the valve housings 81 and 82 respectively. The rotatable valve members 84 and 85 are held open by a trigger mechanism comprising a short trigger pin 86 disposed along the edge of the passage through the valve assembly and engaged between the rotatable valve members thereof immediately adjacent to the bores formed therethrough comprising a portion of the passage through the valve assembly. The trigger pin 86 thereby prevents the rotatable valve members 84 and 85 from closing until separation of the valve housings 81 and 82 occurs. The trigger pin 86 is positioned relatively near but not at the center point of the frangible section of the valve assembly, and provides triggering for fracture initiations occurring at any point on the periphery of the frangible connection. However, the rotatable valve members 84 and 85 will be released more quickly when the fracture initiation is closer to the trigger pin. This embodiment is therefore useful when some sensitivity of triggering response can be sacrificed in exchange for an absolute zero pressure drop through the valve assembly. The trigger pin 86 may be made of a heat-softenable material to achieve the advantage of making the self-closing breakaway valve assembly triggerable in response to heat.

Referring now to FIG. 7, still another embodiment 90 of a self-closing breakaway valve assembly according to the invention herein is shown. It generally comprises left and right valve housing members 91 and 92 having mounted therein rotatable valve members 93 annd 94 respectively, the rotatable valve members being spring biased to close. The rotatable valve members 93 and 94 are mounted within the self-closing breakaway valve assembly 90 so that the periphery of the bores formed therethrough are in the plane of frangibility F and are engaged with each other to maintain rotatable valve members 93 and 94 in open condition until separation of the valve housings 91 and 92 occurs. This embodiment has the advantage of a zero pressure drop therethrough and the absence of any additional trigger mechanism in addition to the rotatable valve members themselves. However, a greater separation of the valve housings 91 and 92 is required to permit the rotatable valve members 93 and 94 to close than is necessary in the embodiments described above.

Various modifications of the self-closing breakaway valve assemblies described herein may be made without departing from the spirit and scope of the invention. For instance, although the rotatable valve members described in the embodiments disclosed are generally spherical in shape, cylindrical or other rotatable valve members may be employed. It will also be appreciated that many different configurations of the valve body may be utilized in accomplishing the requisite frangibility thereof.

It will also be appreciated that several modifications in the trigger mechanism of the self-closing breakaway valve assembly 10 described above may be made. For instance, the trigger ball 61 may be an integral part of one of the cross members of spiders 60 or 62, although clearance must be provided so that the integral trigger member does not interfere with rotation of the valve member to its closed position. However, a separate trigger ball 61 is advantageous where the trigger ball is to be fabricated of heat-softenable material. The trigger ball 61 can also be replaced by a trigger pin engaged between the cross members of spiders 60 and 62 where the configuration of the valve body dictates a greater distance between the rotatable valve members.

One important modification is the provision of a self-closing breakaway valve assembly for sealing off only one of the fluid lines connected thereto. It comprises a valve housing having a rotatable valve member rotatably mounted therein and spring biased to close, and a second member frangibly connected thereto and including a passage for fluid flow therethrough. The second member includes a portion of a trigger mechanism for engaging and holding open the rotatable valve member of the valve housing, wherein separation of the valve housing and the second member releases the trigger mechanism and permits the rotatable valve member to close.

By way of a more specific example, such a self-closing breakaway valve assemly would be provided in any of the embodiments described above by making one of the rotatable part of its housing, whereby the means for rotatably mounting and spring biasing the rotatable valve member are unnecessary. However, the portion of the trigger means which was associated with the rotatable valve member, e.g. the spider member in embodiments shown in FIGS. 1–5, is retained to cooperate with the portion of the trigger means which is a part of the remaining rotatable valve member in holding the rotatable valve member open and releasing it in response to heat or to fracture of the frangible connecting means in substantially the same manner as described above.

The self-closing breakaway valve assemblies according to the invention herein also have applications in areas other than fuel systems. For instance, such assemblies can be used as a portion of hydraulic systems and are particularly useful in maintaining pressure in hydraulic systems when a portion of the system is broken away. Large scale versions of self-closing breakaway valve assemblies may also prove useful in oil pipe lines or in conduits carrying pollutants in the vicinity of harbors, rivers or the like.

Thus, self-closing breakaway valve assemblies have been disclosed which efficiently accomplish the objects of the invention and significantly improve the state of the art by overcoming many of the disadvantages associated therewith.

It is believed that the many advantages of the present invention will now be apparent to those skilled in the art. It will also be apparent that a number of variations and modifications may be made without departing from its spirit and scope. Accordingly, the foregoing description is to be construed as illustrative only rather than limiting.

What we claim is:

1. A self-closing breakaway valve assembly comprising:

A. a first valve housing having a first rotatable valve member rotatably mounted therein, said first valve housing and first rotatable valve member each having a bore formed therethrough, said bores being aligned when said first rotatable valve member is in an open position to provide a passage through said first valve housing, and said first rotatable valve member spring biased to rotate to a closed position wherein the bores of said first rotatable valve member and said first valve housing are misaligned to block the passage through said first valve housing;

B. a second valve housing having a second rotatable valve member rotatably mounted therein, said second valve housing and said second rotatable valve member each having a bore formed therethrough, said bores being aligned when said second rotatable valve member is in an open position to provide a passage through said second valve housing, and said second rotatable valve member spring biased to rotate to a closed position wherein the bores of said second rotatable valve member and said second valve housing are misaligned to block the passage through said second valve housing;

C. frangible means connecting said first and second valve housings with the bores formed therethrough in alignment; and D. trigger means positioned within the aligned bores formed through the connected first and second valve housings, said trigger means engaged between said first and second rotatable valve members to hold them in their open positions, wherein separation of said first and second valve housings upon fracture of the frangible connecting means releases said trigger means engaged between said first and second rotatable valve members and permits said first and second rotatble valve members to rotate to their closed positions.

2. A self-closing breakaway valve assembly as defined in claim 1 wherein said trigger means engaged between said first and second rotatable valve members comprises:

1. a first spider member spanning the bore of said first rotatable valve member;
 2. a second spider member spanning the bore of said second rotatable valve member; and
 3. a trigger member engaged between said first and second spider members.

3. A self-closing breakaway valve assembly as defined in claim 2 wherein said first and second spider members are curved and lie along the circumferences of said first and second rotatable valve members respectively, and wherein said trigger member is engaged between the most closely adjacent points of said first and second spider members to hold said first and second rotatable valve members in their open positions.

4. A self-closing breakaway valve assembly as defined in claim 3 wherein said trigger member is centrally located with respect to the frangible means connecting said first and second valve housings so that the trigger member is released uniformly in response to fracture initiations at any point on the frangible means.

5. A self-closing breakaway valve assembly as defined in claim 4 wherein said trigger member comprises a trigger ball opposing portions of which are received in concave dimples formed on each of said first and second spider members.

6. A self-closing breakaway valve assembly as defined in claim 5 wherein the axes of rotation of said first and second rotatable valve members are generally parallel and said first and second rotatable valve members are spring biased to rotate in opposite direction to their closed position, and wherein said first and second spider members are slightly offset with respect to a line drawn between the axes of rotation in a direction opposite to the direction of rotation of said first and second rotatable valve members, whereby any incremental rotation of said first and second rotatable valve members in the closing direction moves the spider members closer together and increases the interfering engagement between said first and second spider members and the trigger member engaged therebetween.

7. A self-closing breakaway valve assembly as defined in claim 3 wherein said trigger member comprises a trigger ball opposing portions of which are received in concave dimples formed in the facing surfaces of each of said first and second spider members.

8. A self-closing breakaway valve assembly as defined in claim 2 wherein at least one of said first and second spider member is fabricated of heat-softenable material, wherein softening of said spider member upon application of heat thereto releases the trigger member engaged between said first and second spider members and permits said first and second rotatable valve members to close.

9. A self-closing breakaway valve assembly as defined in claim 2 wherein said trigger member is fabricated of heat-softenable material, wherein softening of said trigger member upon application of heat thereto releases it from engagement between the spider members and permits said first and second rotatable valve members to close.

10. A self-closing breakaway valve assembly as defined in claim 1 wherein at least a portion of the trigger means engaged between said first and second rotatable valve members to hold them in their open positions is fabricated of heat softenable material, wherein softening of said portion of said trigger means upon application of heat thereto releases said first and second rotatable valve members and permits them to close.

11. A self-closing breakaway valve assembly as defined in claim 1 wherein said rotatable valve members are generally cylindrical.

12. A self-closing breakaway valve assembly as defined in claim 1 wherein said rotatable valve members are generally spherical.

13. A self-closing breakaway valve assembly as defined in claim 1 wherein said first and second rotatable valve members are rotatably mounted on shafts which extend through said first and second valve housings respectively, and further comprising means associated with said shafts extending through said first and second valve housings respectively to indicate whether the rotatable valve members mounted therein are in their open or closed positions.

14. A self-closing breakaway valve assembly as defined in claim 13 wherein each of said first and second rotatable valve members is spring biased to close by means of at least one torsion springs coiled around a shaft on which the rotatable valve member is rotatably mounted, one end of said torsion spring being engaged with said valve housing and the other end of said torsion spring being engaged with said rotatable valve member.

15. A self-closing breakaway valve assembly as defined in claim 1 wherein said first and second rotatable valve members each include at least one pin protruding therefrom and offset from the axis of rotation thereof, and wherein said first and second valve housings each include a shoulder against which said pin abuts to limit the amount of rotation of the rotatable valve member mounted therein, each of said rotatable valve members being in its closed position when said pin abuts against said shoulder.

16. A self-closing breakaway valve assembly as defined in claim 1 wherein said trigger means engaged between said first and second rotatable valve members comprises:
1. a first spider member spanning the bore of said first rotatable valve member; and
2. a second spider member spanning the bore of said second rotatable valve member and engaged with said first spider member.

17. A self-closing valve assembly comprising:
A. a first valve housing having a first rotatable valve member mounted therein, said first rotatable valve member having a bore formed therethrough, said first valve housing and first rotatable valve member providing a passage through said first valve housing when said first rotatable valve member is in an open position, said first rotatable valve member spring biased to a closed position wherein said passage through said first valve housing is blocked;
B. a second valve housing having a second rotatable valve member mounted therein, said second rotatable valve member having a bore formed therethrough, said second valve housing and said second rotatable valve member providing a passage through said second valve housing when said second rotatable valve member is in an open position, and said second rotatable valve member spring biased to a closed position wherein said passage through said second valve housing is blocked;
C. means connecting said first and second valve housings with the passages therethrough in alignment; and
D. heat-softenable trigger means engaged between said first and second rotatable valve members to hold them in their open positions, wherein application of heat to said heat-softenable trigger means engaged between said first and second rotatable valve members releases said engagement and permits said first and second rotatable valve members to close.

18. A self-closing breakaway valve assembly comprising:
A. a valve housing having a rotatable valve member rotatably mounted therein, said valve housing and rotatable valve member each having a bore formed therethrough, said bores being aligned when said rotatable valve member is in an open position to provide a passage through said valve housing, and said rotatable valve member spring biased to rotate to a closed position wherein the bores of said rotatable valve member and said valve housing are misaligned to block the passage through said valve housing;
B. a housing member having a bore formed therethrough;
C. frangible means connecting said valve housing and said housing member with the bores formed therethrough in alignment; and
D. trigger means engaged between said rotatable valve member and said housing member to hold said rotatable valve member in its open position, said trigger means comprising:
1. a first spider member spanning the bore of said rotatable valve member,
2. a second spider member spanning the bore of said housing member, and
3. a trigger member engaged between said first and second spider members, wherein separation of said valve housing and said housing member upon fracture of the frangible connecting means releases said trigger means engaged between said rotatable valve member and said housing member and permits said rotatable valve member to rotate to its closed positions.

19. A self-closing breakaway valve assembly comprising:
A. a valve housing having a rotatable valve member rotatably mounted therein, said valve housing and rotatable valve member each having a bore formed therethrough, said bores being aligned when said rotatable valve member is in an open position to provide a passage through said valve housing, and said rotatable valve member spring biased to rotate to a closed position wherein the bores of said rotatable valve member and said valve housing are misaligned to block the passage through said valve housing;
B. a housing member having a bore formed therethrough;
C. frangible means connecting said valve housing and said housing member with the bores formed therethrough in alignment; and
D. trigger means engaged between said rotatable valve member and said housing member to hold said rotatable valve member in its open position, said trigger means comprising:
1. a first spider member spanning the bore of said first rotatable valve member, and
2. a second spider member spanning the bore of said housing member and engaged with said first spider member, wherein separation of said valve housing and said housing member upon fracture of the frangible connecting means releases said trigger means engaged between said rotatable valve member and said housing member and permits said rotatable valve member to rotate to its closed positions.

* * * * *

UNITED STATES PATENT OFFICE
CERTIFICATE OF CORRECTION

PATENT NO. : 3,921,656
DATED : November 25, 1975
INVENTOR(S) : Daniel T. Meisenheimer, Jr., Daniel T. Meisenheimer, III and Richard C. Meisenheimer It is certified that error appears in the above-identified patent and that said Letters Patent are hereby corrected as shown below:

Column 1, line 58, "annd" should be --and--. See specification page 2, line 20, as filed.

Column 5, line 33, "surfaces" should be --surface--. See specification page 9, line 20, as filed.

Column 7, line 34, "whenever" should be --wherever--. See specification page 13, line 19, as filed.

Column 8, line 8, insert --valve-- after "breakaway" and before "assembly". See specification page 14, line 27, as filed.

Column 9, line 32, insert --valve members integral with and a solid, non-rotatable-- after "rotatable" and before "part of". See specification page 17, lines 14 - 15, as filed.

Column 11, line 21 (claim 8, line 3), "member" should be --members--. See specification claim 8, line 3, as filed.

Signed and Sealed this twenty-seventh Day of April 1976

[SEAL]

Attest:

RUTH C. MASON
Attesting Officer

C. MARSHALL DANN
Commissioner of Patents and Trademarks